US007409846B2

(12) United States Patent
Frenken

(10) Patent No.: US 7,409,846 B2
(45) **Date of Patent: *Aug. 12, 2008**

(54) PAIR OF PRESSING JAWS FOR HYDRAULIC OR ELECTRIC PRESSING TOOLS, AND INSULATING COVERING FOR A PRESSING JAW

(75) Inventor: Egbert Frenken, Heinsberg (DE)

(73) Assignee: Gustav Klauke GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/534,737

(22) Filed: Sep. 25, 2006

(65) Prior Publication Data

US 2007/0020988 A1 Jan. 25, 2007

Related U.S. Application Data

(62) Division of application No. 10/884,752, filed on Jul. 2, 2004, now Pat. No. 7,216,523.

(51) Int. Cl.
*B21D 37/00* (2006.01)
*B23P 19/04* (2006.01)
*H01R 43/048* (2006.01)

(52) U.S. Cl. ........................ 72/416; 72/453.16; 29/237; 29/751; 81/421

(58) Field of Classification Search ................... 72/416, 72/453.16, 453.15; 29/751, 237, 753; 81/416, 81/421
See application file for complete search history.

(56) References Cited

U.S. PATENT DOCUMENTS

| | | | |
|---|---|---|---|
| 1,743,209 | A | 1/1930 | Groehn |
| 2,600,860 | A | 6/1952 | Dupre |
| 3,323,346 | A | 6/1967 | Spangler et al. |
| 3,427,837 | A | 2/1969 | Faulconer |
| 3,717,744 | A | 2/1973 | Pishioneri |
| 3,877,286 | A | 4/1975 | Fontaine et al. |
| 3,902,385 | A | 9/1975 | Haby |
| 4,026,028 | A | 5/1977 | Green |
| 4,169,652 | A | 10/1979 | Hockele et al. |
| 4,956,992 | A | 9/1990 | Undin |
| 5,012,666 | A | 5/1991 | Chen et al. |
| 5,138,864 | A | 8/1992 | Tarpill |
| 5,243,883 | A | 9/1993 | Savage |

(Continued)

FOREIGN PATENT DOCUMENTS

| | | |
|---|---|---|
| DE | 1812109 | 12/1988 |

(Continued)

OTHER PUBLICATIONS

Electrical Master Catalog, The Electrical Connector Selector, Framatome Connectors USA, Inc. Bumdy Electrical, at least as early as Jul. 2, 2004.

*Primary Examiner*—Daniel C Crane
(74) *Attorney, Agent, or Firm*—Trexler, Bushnell, Giangiorgi, Blackstone & Marr, Ltd.

(57) ABSTRACT

An insulating covering is provided for a pressing jaw of a pair of pressing jaws for hydraulic or electric pressing tools for pressing fittings onto pipes or for the press connection of electric cables. The insulating covering includes a pair of legs having a substantially c-shaped cross-sectional configuration, and an articulation portion provided between the legs.

20 Claims, 11 Drawing Sheets

U.S. PATENT DOCUMENTS

| | | | |
|---|---|---|---|
| 5,284,375 | A | 2/1994 | Land, III |
| 5,490,406 | A | 2/1996 | College |
| 6,035,775 | A | 3/2000 | Nghiem |
| 6,042,166 | A | 3/2000 | Conte |
| 6,044,686 | A | 4/2000 | Dischler |
| 6,244,085 | B1 | 6/2001 | Dummermuth |
| 6,434,998 | B2 | 8/2002 | Amherd |
| 6,457,338 | B1 | 10/2002 | Frenken |
| 6,510,723 | B2 | 1/2003 | Amherd |
| 6,513,198 | B2 * | 2/2003 | Lu .............................. 16/431 |
| 6,772,618 | B2 | 8/2004 | Frenken |
| 6,981,326 | B1 | 1/2006 | Huang |
| 7,000,448 | B2 | 2/2006 | Hamm et al. |
| 7,043,806 | B2 | 5/2006 | Schrock et al. |
| 7,124,608 | B2 | 10/2006 | Goop |
| 2001/0027676 | A1 | 10/2001 | Frenken |
| 2005/0120770 | A1 | 6/2005 | Frenken |
| 2005/0241359 | A1 | 11/2005 | Viegener |
| 2006/0000072 | A1 | 1/2006 | Frenken |

FOREIGN PATENT DOCUMENTS

| | | |
|---|---|---|
| DE | 29703053 | 5/1997 |
| DE | 29718204 | 1/1998 |
| DE | 20113238 | 11/2001 |
| DE | 20213661 | 11/2002 |
| DE | 10200258 | 7/2003 |
| DE | 10318508 | 8/2004 |
| DE | 10354307 | 8/2004 |
| EP | 389716 | 10/1990 |
| EP | 676835 | 10/1995 |
| EP | 860245 | 8/1998 |
| SU | 1365207 | 7/1988 |
| WO | 02/38475 | 5/2002 |

* cited by examiner 1
2
3
5
7
8
9
10
12
13
14
15
16
22
X

PAIR OF PRESSING JAWS FOR HYDRAULIC OR ELECTRIC PRESSING TOOLS, AND INSULATING COVERING FOR A PRESSING JAW

This application is a divisional application of U.S. Ser. No. 10/884,752, filed on Jul. 2, 2004, now Pat. No. 7,216,523.

FIELD OF THE INVENTION

The invention relates, in the first instance, to a pair of pressing jaws for hydraulic or electric pressing tools for pressing fittings onto pipes or for the press connection of electric cables, the two pressing jaws being disposed for rotation about a common axis of rotation and each pressing jaw forming a bearing eye for this purpose.

BACKGROUND OF THE INVENTION

Pairs of pressing jaws of the type in question are known and are used, inter alia, for pressing fittings onto pipes, particularly in the sanitary sector. Such pairs of pressing jaws are also used for the press connection of electric cables or for pressing on cable lugs or the like. Such pairs of pressing jaws are preferably secured in a pivotable and exchangeable manner on a pressing tool.

In respect of the known prior art, a technical problem of the invention is to configure a pair of pressing jaws of the type in question in a more functionally advantageous manner.

SUMMARY OF THE INVENTION

This problem is solved first and foremost in the case of the subject matter of Claim 1, this being based on the fact that each pressing jaw forms two bearing eyes with coaxial bearing openings, and the bearing eyes are disposed in an interengaging manner in the assembled state, one bearing eye of one pressing jaw engaging between the two bearing eyes of the other pressing jaw. The pair of pressing jaws according to the invention is suitable for pressing operations in the range of from 3 to 9 tonnes of pressing force. The two pressing jaws here are disposed for rotation, in known manner, in a substantially mirror-symmetrical manner in relation to one another about the common axis of rotation, the pressing jaws, furthermore, being formed from pressing levers with one end having the pressing jaws, which form a pressing mouth in the closed position, and the ends located opposite the pressing jaws having curved tracks on which tool-mounted pressing rollers act. The pairs of pressing jaws can be pivoted in conventional manner like pliers about the axis of rotation, closure of the pressing mouth from an optionally spring-activated basic position, in which the pressing mouth is open, being made possible by means of tool-mounted pressing rollers acting simultaneously and uniformly on the curved tracks. The physical axis of rotation here is formed by a bolt or the like which passes through the bearing openings of the pressing jaws and is mounted in an accommodating neck of the pressing tool. In a development of the invention, it is provided that the bearing eyes of a pressing jaw have different thicknesses, it thus being possible, for example, for the thickness of one bearing eye to correspond approximately to twice to five times the thickness of the other bearing eye of the same pressing jaw, with the thickness measured in the direction of the axis of rotation. It is further proposed that the bearing eye of greater thickness of one pressing jaw is disposed, in the assembled state, between the bearing eye of greater thickness and the bearing eye of lesser thickness of the other pressing jaw. The clear spacing between the bearing eye of greater thickness and the bearing eye of lesser thickness of one pressing jaw thus corresponds approximately to the thickness of the thicker bearing eye. As a result, it is advantageously made possible for the pressing jaws to be configured identically to one another, which further proves to be advantageous in terms of production. Only one type of pressing jaw thus has to be produced. Two of these identical pressing jaws form a pair of pressing jaws. It is also provided that outwardly oriented stops are formed on one of the bearing eyes in order to limit the pivotability of the mounted pivoting jaw. These stops preferably interact with the pressing-tool accommodating neck, which is fixed in relation to the pressing jaws, both the open position and the closed position of the pressing mouth, furthermore, being stop-limited as a result of this configuration. The stops are preferably disposed on the outside of the bearing eye of lesser thickness. In order for the pressing jaws to be configured in a variable manner in respect of the pressing of different fittings, it is provided that the pressing jaw is formed with a mount for a pressing insert. In a further-preferred configuration, it is provided that the pressing jaws are preloaded into their open position. Correspondingly, the pair of pressing jaws, in the basic position, in which they are not subjected to loading by the pressing tool, have the pressing mouth in the open position, and can thus be applied to the pressing location without any further pivoting measure. The preloading is preferably achieved by a tension spring which is disposed so as to engage over a separating joint between the pressing jaws. For this purpose, the tension spring is secured at its ends, in each pressing jaw, in a bore which passes through the latter transversely to the direction in which the tension spring extends, thus, in particular, by means of a pin which receives the respective free end of the tension spring and is positioned in the bore which passes through the pressing jaw. The tension spring passes through the pressing jaw in the region of a further bore which extends from the narrow peripheral side directed toward the opposite pressing jaw. In particular when using the pair of pressing jaws for the press connection of electric cables, it is provided that each pressing jaw has an insulating covering on its narrow peripheral side. This insulating covering is formed as a plastics-material part which can be associated in a releasable manner with the respective pressing jaw. The insulating covering may be produced as a plastics injection molding, for example consisting of polyethylene. The significant factor here is that the insulating covering extends over the entire width of the narrow peripheral side, as measured in the direction of the thickness of the pressing jaw, and further preferably over the entire length for which this narrow peripheral edge extends. For a releasable arrangement on the pressing jaw, it is provided that the insulating covering is partly pushed on and partly clipped on. Thus, the insulating covering, in the region of the pressing-jaw mouth, can be pushed in the manner of a shoe onto the pressing-lever portion of the pressing jaw, whereas the rest of the insulating covering is clipped onto the pressing jaw in the region of the narrow peripheral side. In order to secure the insulating covering in the pushed-on state, a securing rib is provided on the pressing-mouth side of a pressing jaw, the securing rib projecting transversely to the longitudinal plane of the jaw. This securing rib is formed integrally with the pressing jaw and extends along the peripheral contour of the pressing jaw in the pressing-mouth region. It is possible to provide a securing rib associated with a broad side of the pressing jaw. An arrangement is also conceivable, while maintaining the identical configuration of the two pressing jaws, in which two securing ribs are located opposite one another. In this respect, it proves to be further advantageous that the insulating covering, with a substantially C-shaped cross-sectional configuration, has an articulation portion, as a result of which handling is simplified both when the insulating covering is disposed on the pressing jaw and when it is removed. Those regions of the insulating covering which are adjacent to the articulation portion have a substantially U-shaped cross-sectional configuration, the articulation portion being accompanied by a reduction in cross-section of the U-legs, to the extent where, in a portion which forms a geometrical articulation axis, the U-legs tend toward zero; correspondingly, only a U-crosspiece remains here. Over the longitudinal extent of the insulating portion, this U-crosspiece, which forms the geometrical articulation axis, is adjoined on both sides, in the first instance, by a portion with a U-shaped cross-sectional configuration and, thereafter, by a portion with a C-shaped cross-sectional configuration in each case. A widening of the U-crosspiece is formed in the region of the articulation portion, which widening continues, over the longitudinal extent of the insulating covering, into a rib which projects outward on the outer wall of the U-legs. When the insulating covering is applied to the pressing jaw, a securing pin for pressing inserts is associated with its articulation portion, the securing pin being provided on the pressing jaw. Correspondingly, the U-leg-free zone of the insulating covering engages around the securing pin. The articulation portion, furthermore, is formed eccentrically in relation to the longitudinal extent of the insulation covering, the articulation portion preferably being formed between the push-on portion and the clip-on portion of the insulating covering. Accordingly, in particular the application of the insulating covering to the pressing jaws is facilitated in that, in the first instance, the push-on portion is pushed onto the pressing jaw on the pressing-mouth side and, thereafter, the clip-on portion is pivoted about the articulation portion in the direction of the associated narrow peripheral side of the pressing jaw, in order finally for this portion to be clipped on. As seen in the longitudinal extent of the insulating covering, the length of the clip-on portion corresponds approximately to twice to five times, preferably three times, the length of the push-on portion. In order to secure the clip-on portion, the pressing jaw has further securing ribs which project transversely to the longitudinal plane of the jaw and run along the peripheral edge of the jaw. These securing ribs may be of cross-sectionally identical configuration to the securing ribs for forming the push-on securing means. In this respect, a securing rib disposed along the pressing-jaw peripheral contour which is directed toward the narrow peripheral side may be formed more or less continuously, optionally with an interruption in the region of the securing pin and, correspondingly, in the region of the articulation portion of the insulating covering. It is also provided that the securing pins for the pressing inserts of the two pressing jaws can be actuated in opposite directions, thus, in particular, by pressure actuation in the axial direction of the respective securing pin. The securing pins are oriented perpendicularly to a longitudinal plane of the jaws and pass through the respective pressing jaw in the region of the pressing-jaw mouth.

The invention also relates to an insulating covering for a pressing jaw of a pair of pressing jaws for hydraulic or electric pressing tools for pressing fittings onto pipes or for the press connection of electric cables. In particular in the case of the press connection of electric cables or the operation of pressing on cable lugs or the like, it is known to provide pressing jaws with an insulating covering. These are usually produced as plastics injection moldings, that is to say, also, for example, from polyethylene. It is further known in this respect for these insulating coverings to be secured in a releasable manner on the pressing jaws. In order to simplify the handling of such an insulating covering, in particular when it is disposed on a pressing jaw and removed therefrom, it is proposed that the insulating covering, with a substantially C-shaped cross-sectional configuration, has an articulation portion. As a result of this configuration, an insulating covering for a pressing jaw is provided, which has improved handling. The formation of the articulation portion significantly facilitates the operations both of disposing the insulating covering on the pressing jaw and of removing it therefrom. The insulating covering can be adapted more easily over its longitudinal extent, by means of the formation of the articulation portion, to the rounded outer contour of the pressing jaw, in order finally to be secured. The insulating covering has a push-on portion and a clip-on portion, the push-on portion being formed such that it is directed toward that end of the insulating covering which is to be associated with the pressing mouth. The clip-on portion, in contrast, is associated with the back of the pressing jaws. In relation to the longitudinal extent of the insulating covering, the clip-on portion has a length which corresponds approximately to twice to five times, preferably three times, the length of the push-on portion. Those regions of the insulating covering which are adjacent to the articulation portion preferably have a substantially U-shaped cross-sectional configuration, the articulation portion being accompanied by a reduction in cross-section of the U-legs. The length of the U-legs in the articulation portion tends toward zero, so that, in the region of a geometrical articulation axis, the articulation portion is preferably formed just by the U-crosspiece. A widening of the U-crosspiece is further preferably formed in the region of the articulation portion. The widening is provided on both sides, the widened portion of the U-crosspiece, running over the longitudinal extent of the insulating covering, forming an outwardly oriented crosspiece in the region of the adjacent U-legs. The articulation portion is formed eccentrically in relation to the longitudinal extent of the insulating covering, that is to say preferably between the push-on portion and the clip-on portion. In addition to the insulating action, the insulating covering may also possibly serve as rupture protection in the pressing-mouth region. The proposed articulation portion also proves to be advantageous here.

DESCRIPTION OF THE DRAWINGS

The invention is explained in more detail hereinbelow, with reference to accompanying drawings, which illustrate merely two exemplary embodiments and in which.

DETAILED DESCRIPTION OF THE ILLUSTRATED EMBODIMENTS

Figure 1:
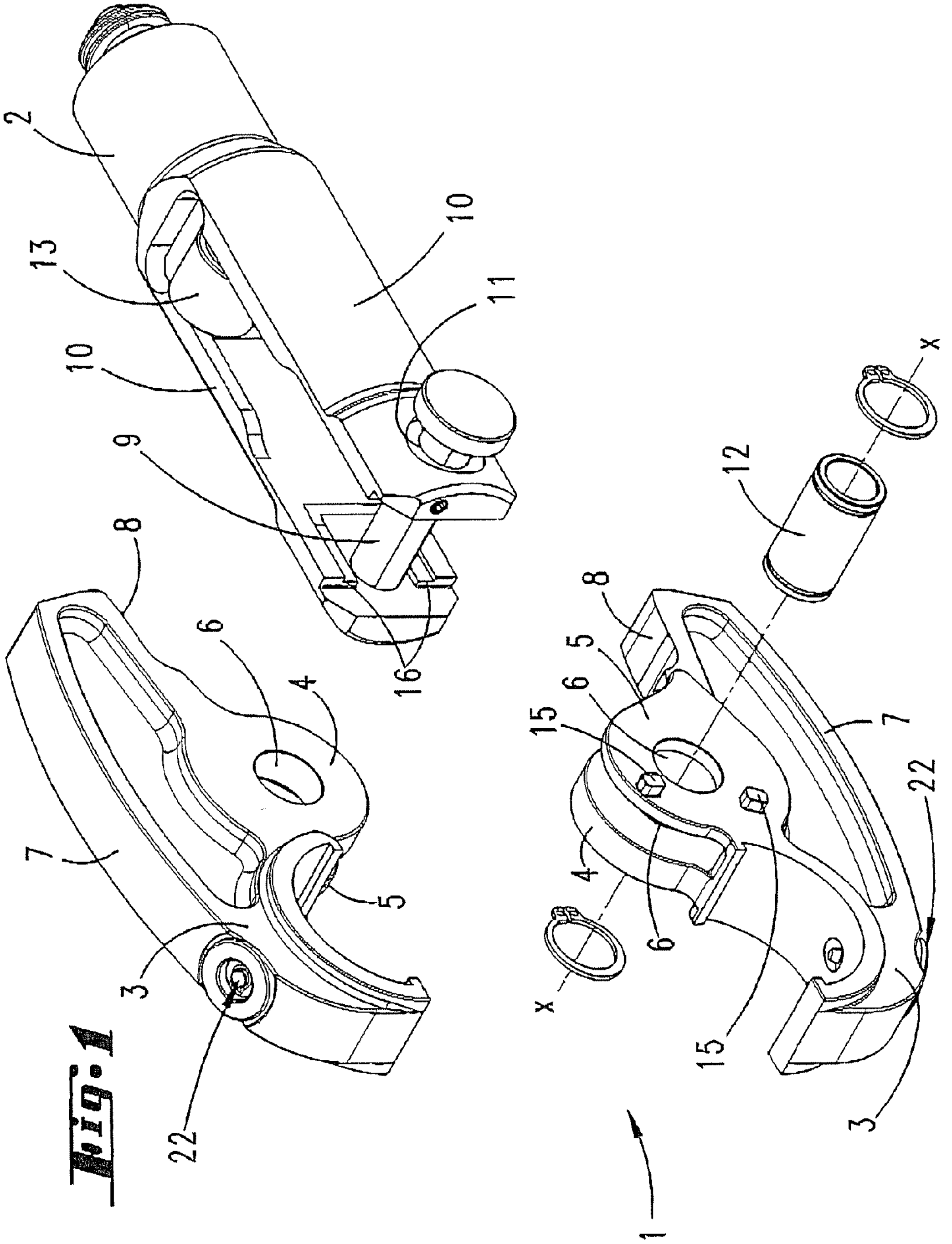
FIG. 1 shows an exploded illustration, in perspective, of a pair of pressing jaws according to the invention in a first embodiment, with an accommodating neck of a pressing tool.
Figure 2:
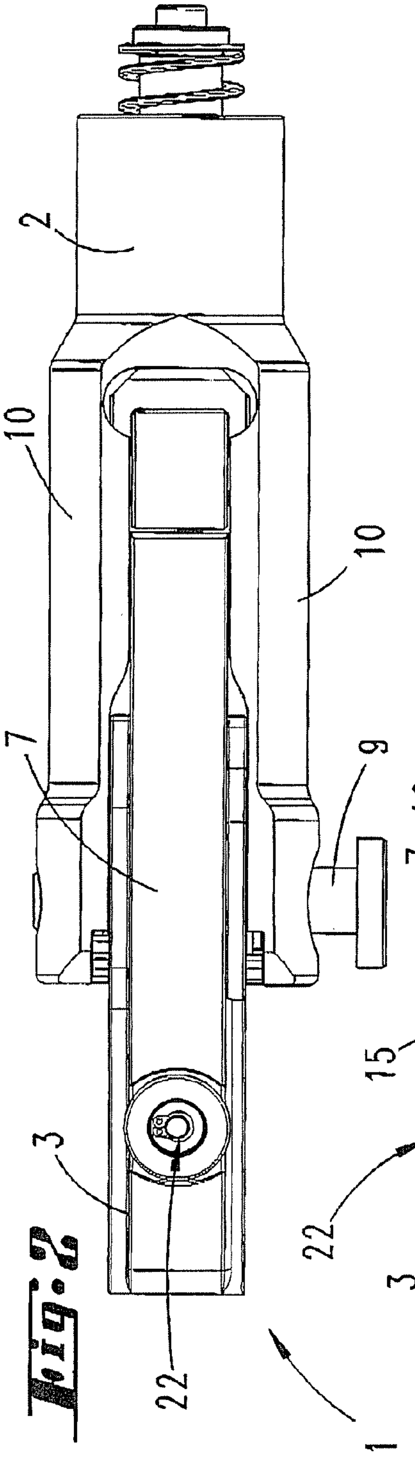
FIG. 2 shows the mounted position of the pressing jaws on the accommodating neck in plan view, this view relating to the open position of the pressing mouth.

Illustrated and described, in the first instance with reference to FIG. 1, of a pair 1 of pressing jaws, in a first embodiment, for a hydraulic or electric pressing tool, merely an accommodating neck 2 of the latter, for accommodating a pair 1 of pressing jaws, being shown in the illustrations.

The two pressing jaws 3 are configured identically to one another and each have two bearing eyes 4, 5 with coaxial bearing openings 6.

The pressing jaws 3 are part of a pressing lever 7 which, on one side of the bearing opening 6, forms the pressing jaw 3 and, on the other side of the bearing opening 6, forms a curved track 8.

The bearing eyes 4, 5 of each pressing jaw 3 have different thicknesses, as measured in the axial direction of the bearing openings. The bearing eye 4 is thus approximately three times the thickness of the bearing eye 5.

The clear distance between the two bearing eyes 4 and 5 corresponds approximately to the thickness of the thicker bearing eye 4, and is thus matched to the thickness of the bearing eye 4.

The pressing jaws 3 are oriented in relation to one another in the assembled state such that the bearing eyes 4, 5 are disposed in an interengaging manner. The thicker bearing eye 4 of one pressing jaw 3, accordingly, is disposed between the two bearing eyes 4, 5 of the other pressing jaw 3. The thinner bearing eyes 5 are thus located on the outside of the pair 1 of pressing jaws formed.

The bearing openings 6 of the two pressing jaws 3 are oriented coaxially in relation to one another and, in the assembled state, have a locking bolt 9 of the accommodating neck 2 passing through them.

The accommodating neck 2 is of conventional fork-like configuration with a bolt mount 11 in the form of a through-passage bore passing through the fork legs 10 transversely to the direction in which the neck extends. The locking bolt 9 is secured in this bolt mount 11.

The bearing eyes 4, 5 of the pressing jaws 3 extend between the fork legs 10, a sleeve 12 being positioned between the bearing openings 6 and the locking bolt 9.

The curved tracks 8 of the pressing lever 7 project into the region between the fork legs 10 of the accommodating neck 2 and, during the pressing operation, are subjected to the action of rolling bodies 13 of the pressing tool, which are displaceable, preferably hydraulically, in the direction of the curved track 8, this causing the pressing levers 7 to spread apart in the region of the curved track 8 and consequently causing the pressing mouth 14, formed by the pressing jaws 3, to close.

Figure 3:
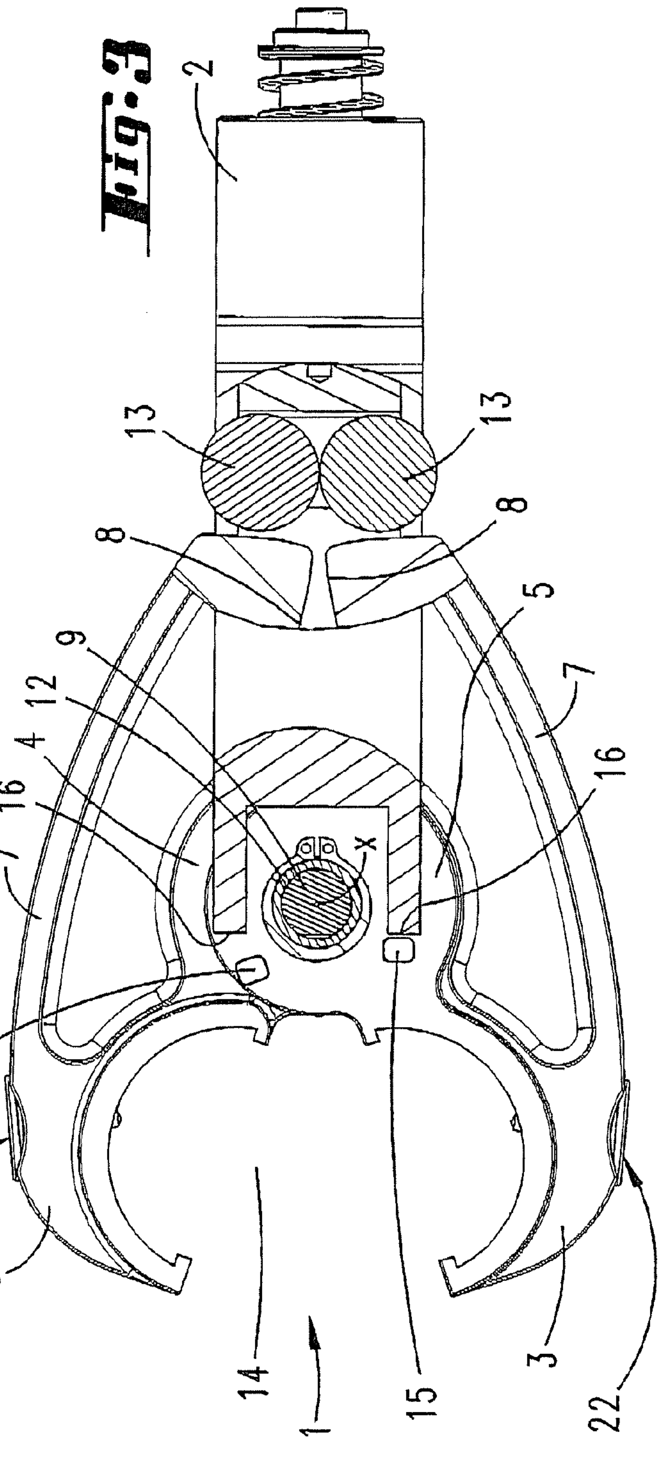
FIG. 3 shows an offset longitudinal section through the arrangement according to FIG. 2.
Figures 4, 5:
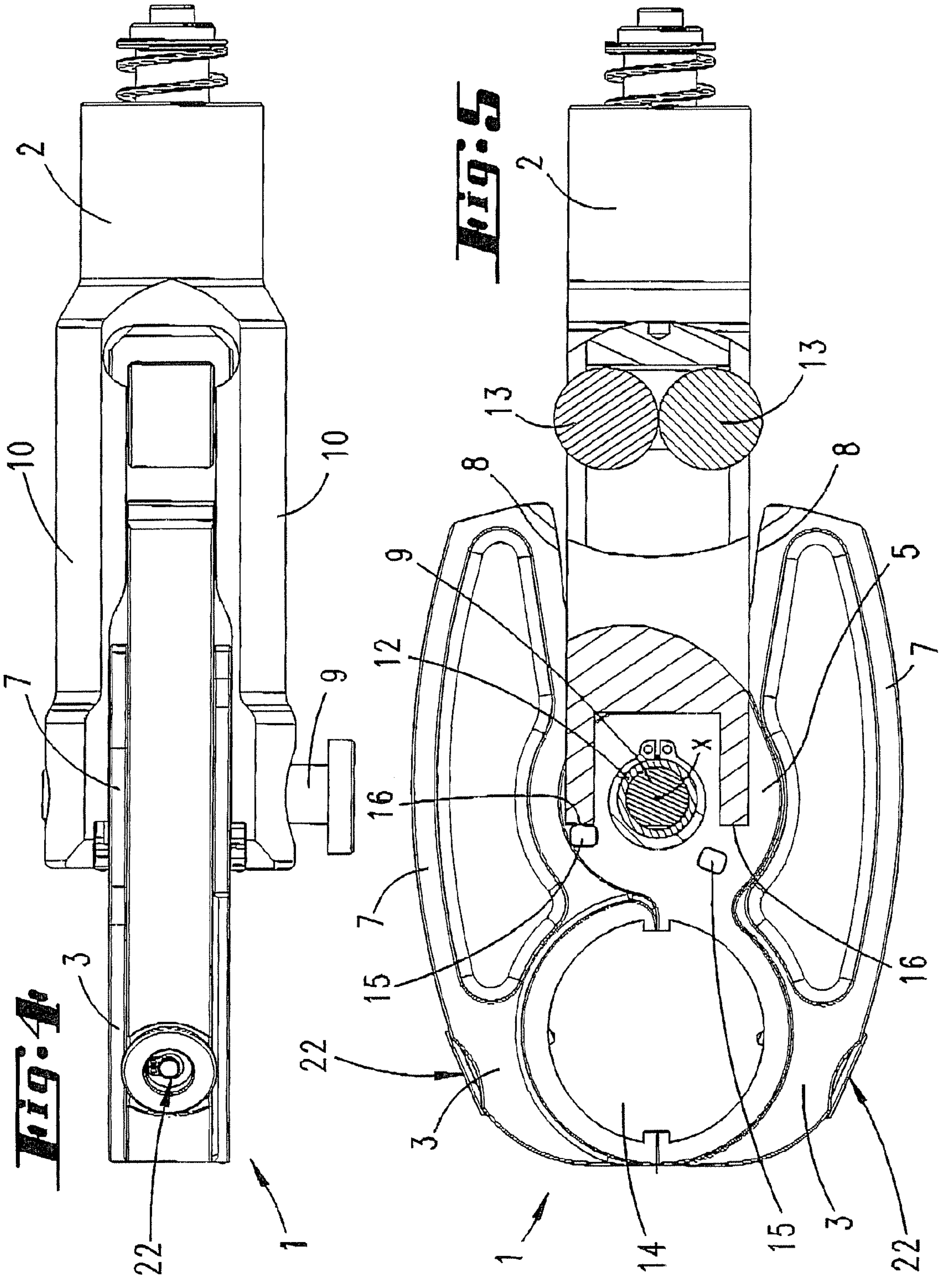
FIG. 4 shows an illustration corresponding to FIG. 2, but this time relating to the closed position of the pressing mouth.
FIG. 5 shows a sectional illustration according to FIG. 3, likewise relating to the closed position of the pressing mouth.
Figure 6:
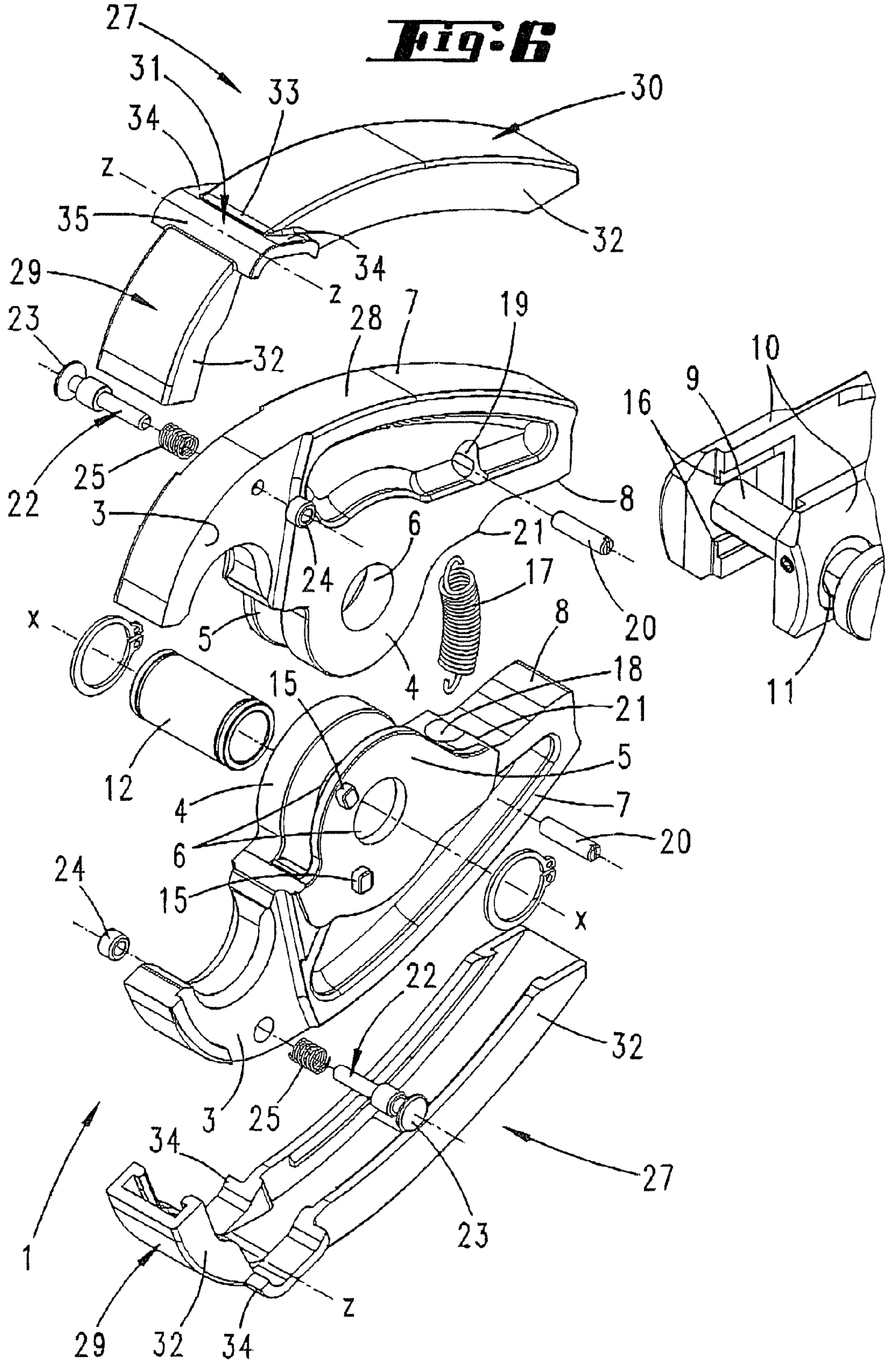
FIG. 6 shows an exploded illustration, in perspective, of a pair of pressing jaws in a second embodiment.

Both the open position of the pressing mouth (see FIG. 3) and the closed position of the pressing mouth (see FIG. 5) are defined by outwardly oriented, block-like stops 15 disposed on the thinner bearing eyes 5, these stops limiting the pivotability of the mounted pressing jaws 3.

These stops 15 move over a circular path about the axis of rotation x of the pressing jaws 3 and interact with an end surface 16 of the accommodating neck 2.

The pressing jaws 3, in addition, are formed with a mount 17 for exchangeable pressing inserts (not illustrated).

FIGS. 6 to 19 show a second embodiment, the same components, in relation to the first embodiment, having the same reference numbers.

Figures 7, 8:
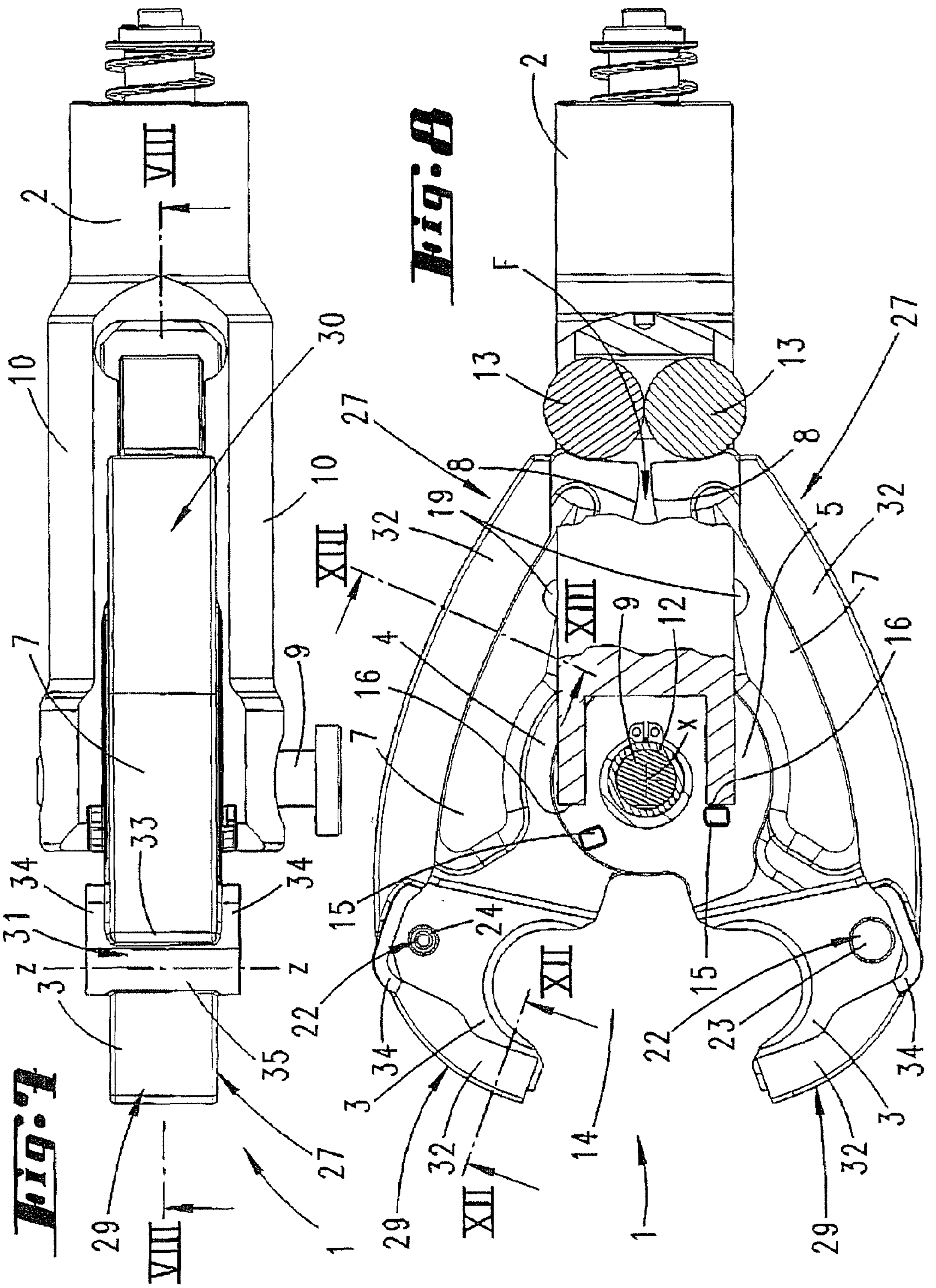
FIG. 7 shows the mounted position of the pressing jaws on the accommodating neck in plan view, this view relating to the open position of the pressing mouth.
FIG. 8 shows an offset longitudinal section through the arrangement according to FIG. 7.

The pressing jaws 3 of the second embodiment are preloaded into their open position, which is illustrated for example in FIG. 8, a tension spring 17 being provided for this purpose. This tension spring is disposed in order to engage over the separating joint F between the pressing levers 7 of the pressing jaws 3 and is positioned, in each pressing jaw, in an accommodating bore 18 which opens out into that narrow peripheral side of the pressing jaw 3 which is directed toward the separating joint F. The two accommodating bores 18 of the pressing jaws 3 are disposed opposite one another. These accommodating bores 18 open out, at the other end, into bores 19 which pass through the pressing jaw 3, transversely to the direction in which the tension spring 17 extends, in the region of the pressing lever 7. Positioned in each of these bores 19 is a retaining pin 20 which receives the respective end of the tension spring 17 and in this respect, in interaction with the wall of the bore 19, serves as a spring anchor.

Figure 9:
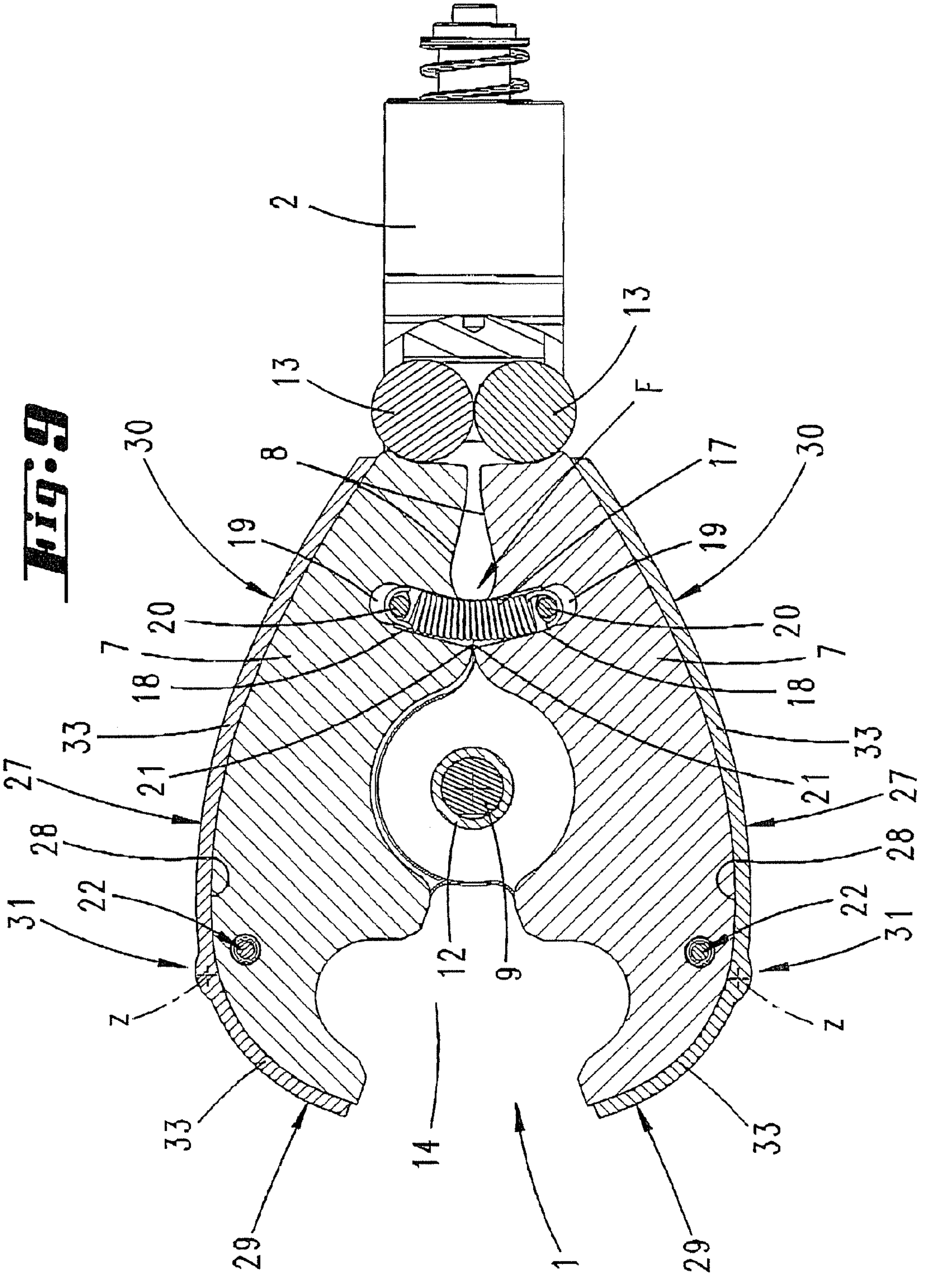
FIG. 9 shows the section along line IX-IX in FIG. 7.

In the open position of the pressing jaws according to the illustrations in FIGS. 8 and 9, those portions of the facing narrow peripheral sides of the pressing jaws 3 which are adjacent to the accommodating bores 18 of the tension spring 17 engage against one another in a stop-limiting manner. These narrow-periphery stop regions are designated 21 in FIG. 9.

In contrast to the first exemplary embodiment, in which any pressing inserts are secured by means of securing pins 22 engaging more or less radially in the pressing mouth 14, the second exemplary embodiment provides securing pins 22 which extend parallel in space to the axis of rotation x of the pressing jaw 3 and thus parallel in space to the axis of the pressing mouth. These securing pins 22 pass through the pressing jaw 3 in the region surrounding the pressing mouth 14, the securing pin 22 being provided, at one end, with a plate-like handle grip 23 and, at the other end, that is to say on that broad side of the jaw which is located opposite the grip, with an insert-securing portion 24. The latter is of cylindrical form with a circular cross-section. By virtue of the securing pin 22 being pushed in its axial direction, the securing portion 24 is correspondingly displaced away from the broad side of the jaw, counter to the action of an interposed compression spring 25, in order to free a region of reduced cross-section. In this position, the pressing insert 26 can be removed or inserted.

It is also the case with this embodiment that the identical configuration is still ensured, this further resulting in a situation where the securing pins 22 of the two pressing jaws 3 can be actuated in opposite directions. Corresponding to a broad side of the pair 1 of pressing jaws, the grip 23 is disposed on one pressing jaw 3 and the securing portion 24 is disposed on the opposite pressing jaw 3.

For the press connection of electric cables or for pressing, for example, a cable lug onto an electric cable, it is also possible to provide insulating coverings 27 in addition to the corresponding pressing inserts 26. For this purpose, each pressing jaw 3 is assigned an insulating covering 27.

In FIGS. 14 to 19, an insulating covering 27 is illustrated in different views. The latter, in the first instance, is preferably produced as a plastics injection molding made of polyethylene or the like and has a substantially C-shaped cross-sectional configuration. Over its longitudinal extent, the insulating covering 27 is formed convexly with changing radii, as seen over its length, matched to the outer contour of a pressing jaw 3 in the region of the narrow peripheral side 28 of the latter.

As seen over its longitudinal extent, the insulating covering 27 is made up of substantially three portions: a push-on portion 29 and a clip-on portion 30 and also an articulation portion 31, which is formed between these two portions 29 and 30. The clip-on portion 30 has a length which corresponds approximately to three times the length of the push-on portion 29.

The substantially C-shaped cross-sectional configuration is interrupted in the region of the articulation portion 31. The regions which are adjacent to the articulation portion 31 on both sides, that is to say the transition regions to the push-on portion 29 and to the clip-on portion 30, have a substantially U-shaped cross-sectional configuration, the articulation portion 31 being accompanied by a reduction in cross-section of the U-legs 32. The latter tend toward zero, so that, in the region of the geometrical articulation axis z, only the U-crosspiece 33 remains. The latter is widened outward beyond the two U-legs 32. This widened portion 34 extends out of the region of the geometrical articulation axis z into the region of the adjacent U-legs 32 of the clip-on portion 30. This results—as can be seen, for example, from the illustrations in FIGS. 17 and 18—in a shield-like protective collar 35 in the region of the articulation portion 31.

In order for the insulation covering 27, which can be disposed in a releasable manner, to be secured on the associated pressing jaw 3, the latter has corresponding retaining means. Thus, each pressing jaw 3, associated with a broad side of the jaw, has a securing rib 36 which projects transversely to the longitudinal plane of the jaw and, beginning from the free end of the pressing-mouth portion of the pressing jaw 3, extends approximately into the surroundings of the associated securing pin 22. As can be gathered from the illustrations, such a securing rib 36 is only provided on one side. However, a solution with securing ribs 36 disposed on both broad sides of the jaw is also conceivable in this respect.

The securing rib 36 adjoins the contour of the narrow periphery of the pressing jaw 3, this resulting in a T-shaped configuration in cross section in the case of securing ribs 36 being formed on both sides.

Such a T-shaped cross-sectional configuration is also selected in the region of the pressing levers 7. Correspondingly, a latching rib 37, the cross-sectional configuration of which corresponds more or less to that of the securing rib 36, extends on both sides, that is to say on each broad side of the pressing jaw 3, along the pressing lever 7, on the far side of the securing pin 22—in relation to the pressing mouth 14. It is also possible to provide on the broad side of the pressing jaw 3, which has the securing rib 36, a rib which is continuous along the peripheral contour and is provided with a generous interruption only in the region of the securing pin 22.

The insulating coverings 27, like the pressing jaws, are of identical form.

In order to secure an insulating covering 27 on a pressing jaw 3, in the first instance the push-on portion 29 is attached on the pressing-mouth side, the securing rib 36 being gripped by the C-shaped cross-section of the push-on portion 29 during the push-on operation. The articulated arrangement of the clip-on portion 30 on the push-on portion 29 here allows straightforward handling. Finally, the clip-on portion 30 is positioned on the narrow peripheral side 28, the C-crosspieces 38 of the clip-on portion 30 gripping the latching ribs 37 on the pressing jaws.

Figures 10, 11:
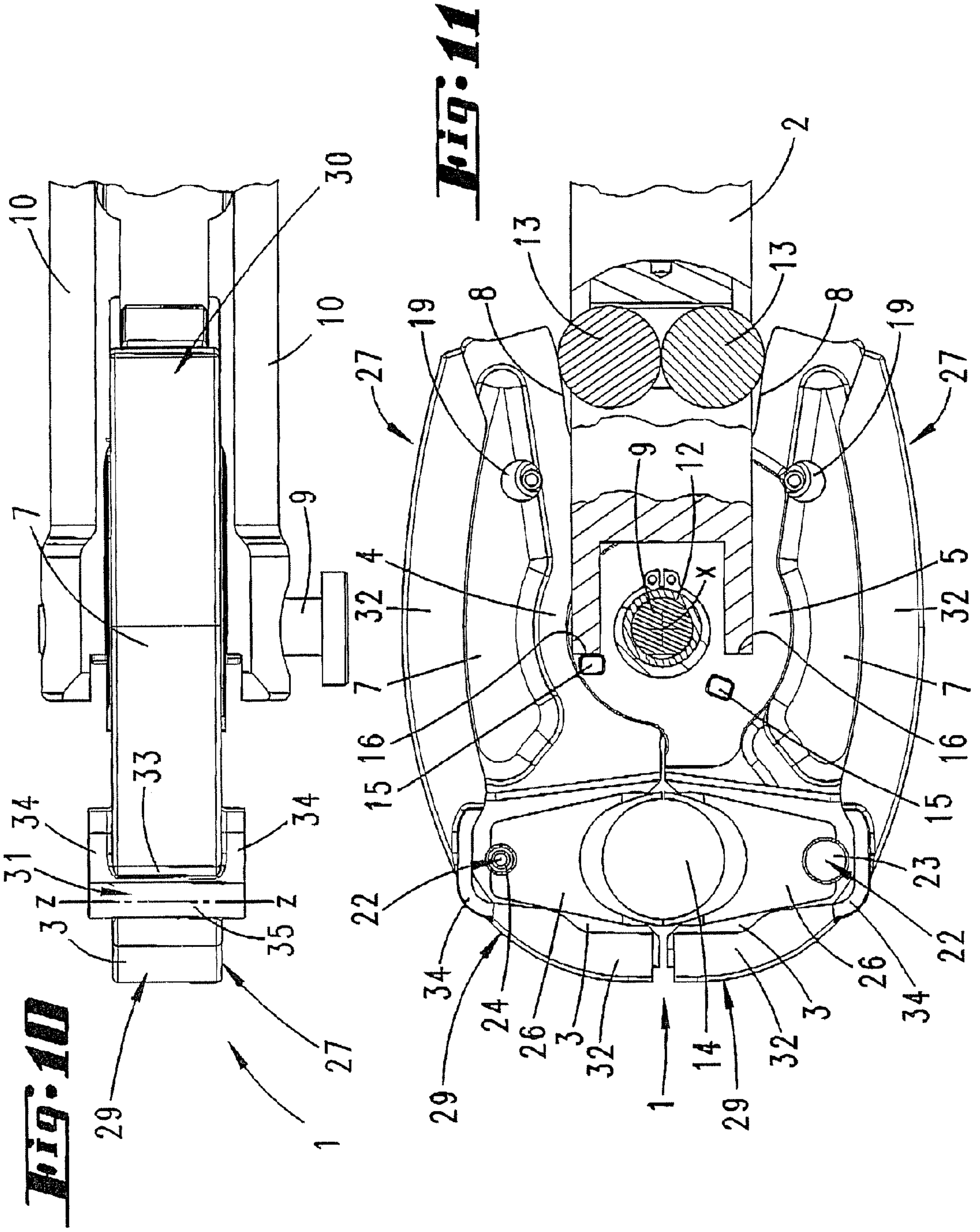
FIG. 10 shows the plan view according to FIG. 7, but this time relating to the closed position of the pressing mouth with pressing-mouth inserts inserted.
FIG. 11 shows an illustration corresponding to FIG. 8, but this time relating to the closed position of the pressing mouth.
Figure 12:
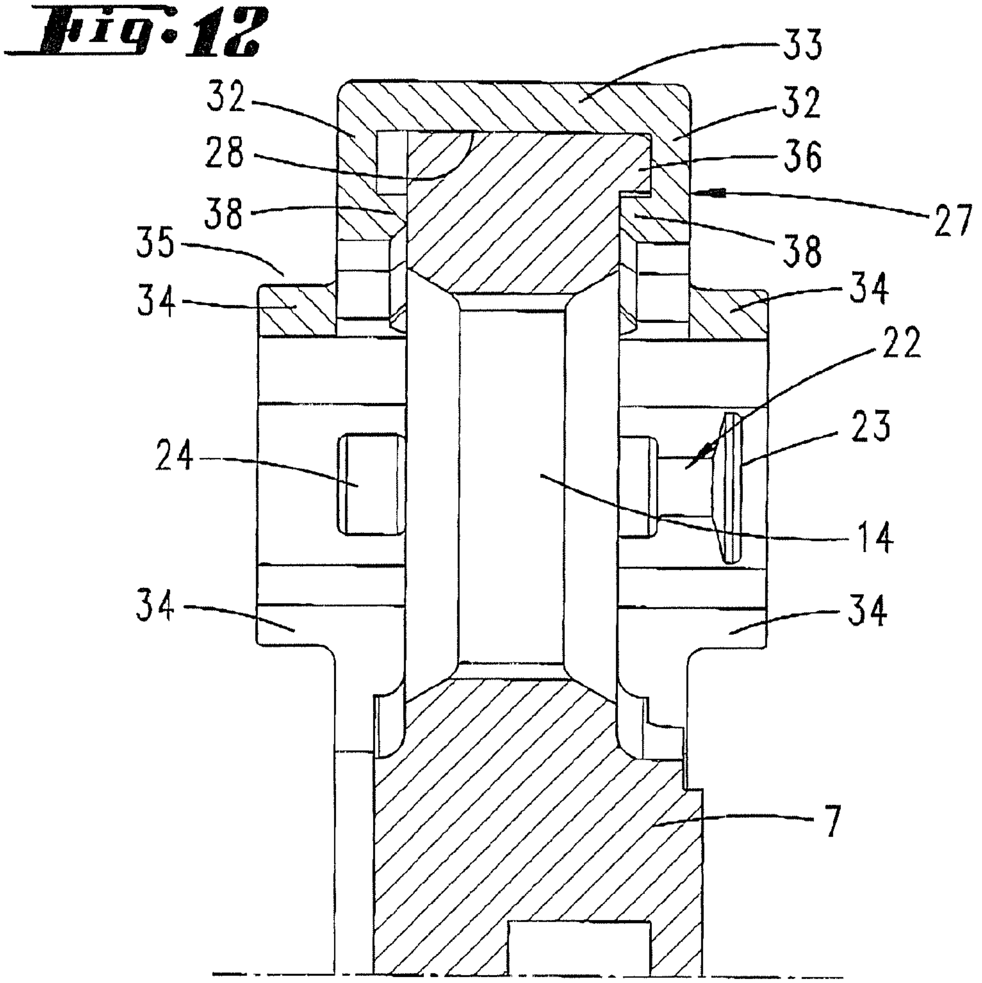
FIG. 12 shows the enlarged section along line XII-XII in FIG. 8.
Figure 13:
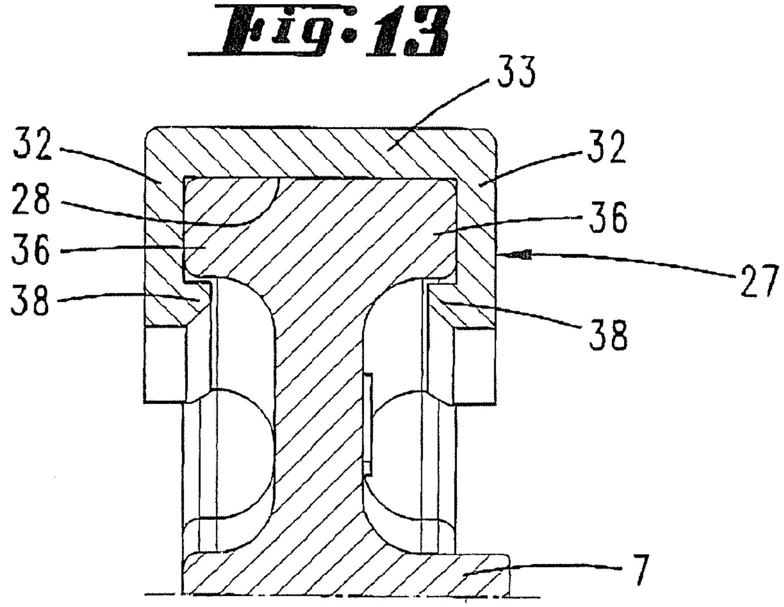
FIG. 13 shows the enlarged section along line XIII-XIII in FIG. 8.
Figure 14:
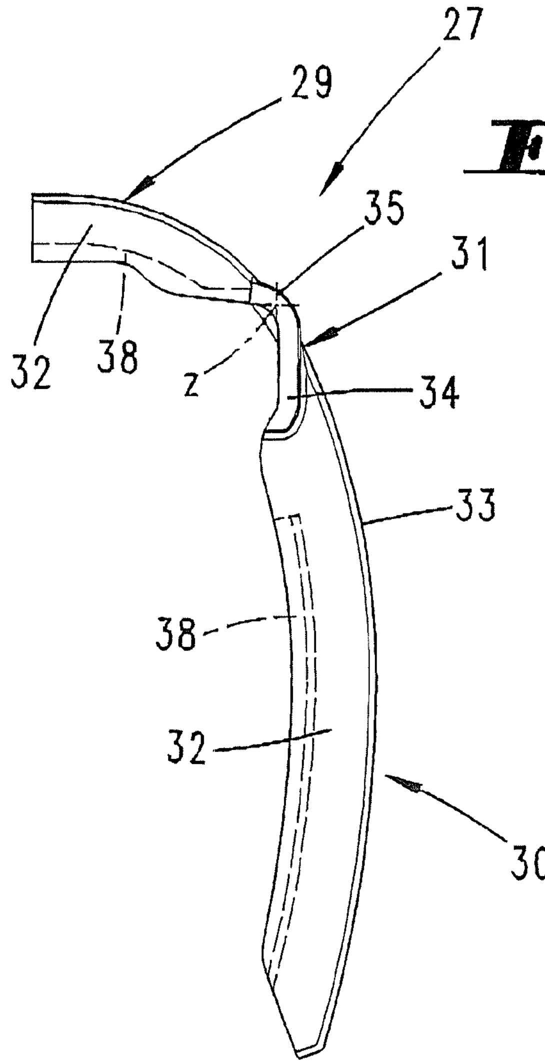
FIG. 14 shows a side view of an insulating covering of a pressing jaw illustrated on its own.
Figure 15:
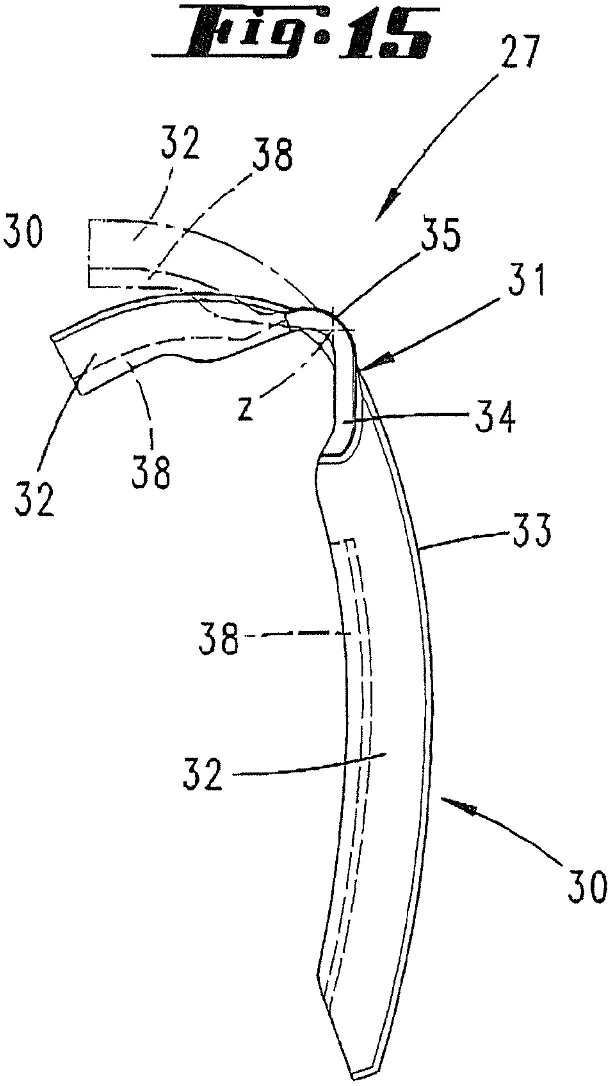
FIG. 15 shows an illustration corresponding to FIG. 14, but this time relating to a pivoted position of an end portion of the insulating covering which forms a push-on portion.
Figure 16:
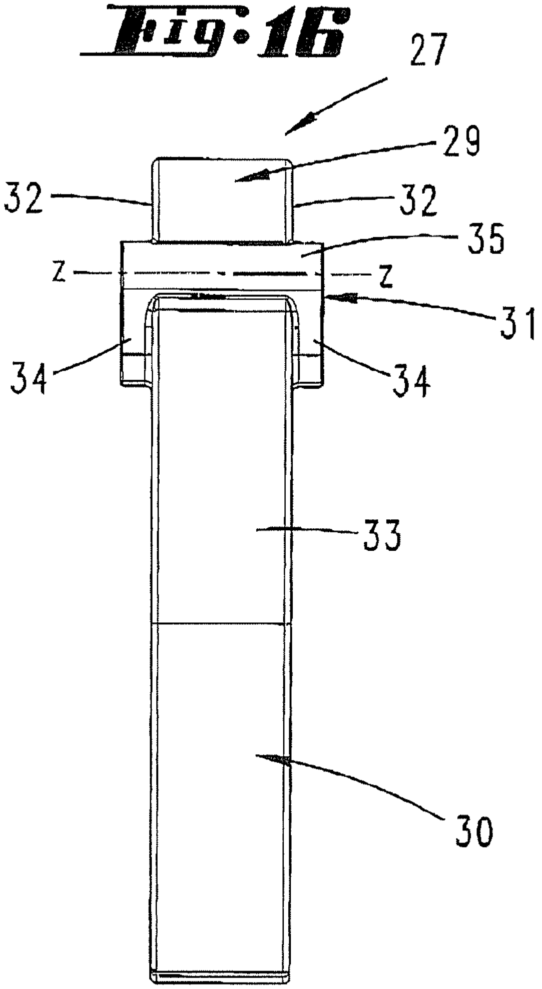
FIG. 16 shows the front view of the insulating covering.
Figure 17:
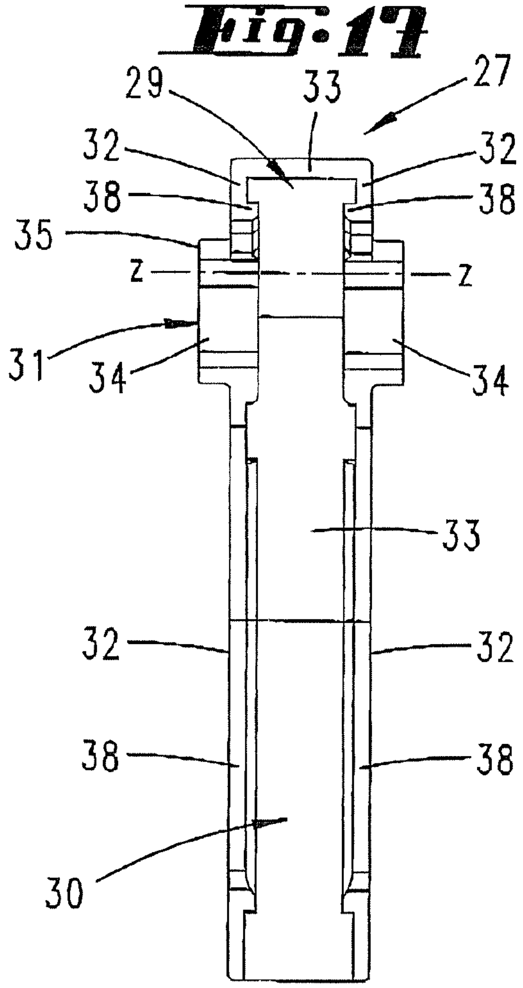
FIG. 17 shows the rear view of the insulating covering.
Figure 18:
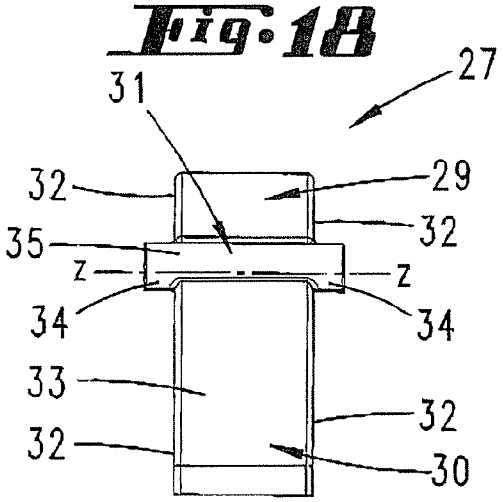
FIG. 18 shows the plan view of the insulating covering.
Figure 19:
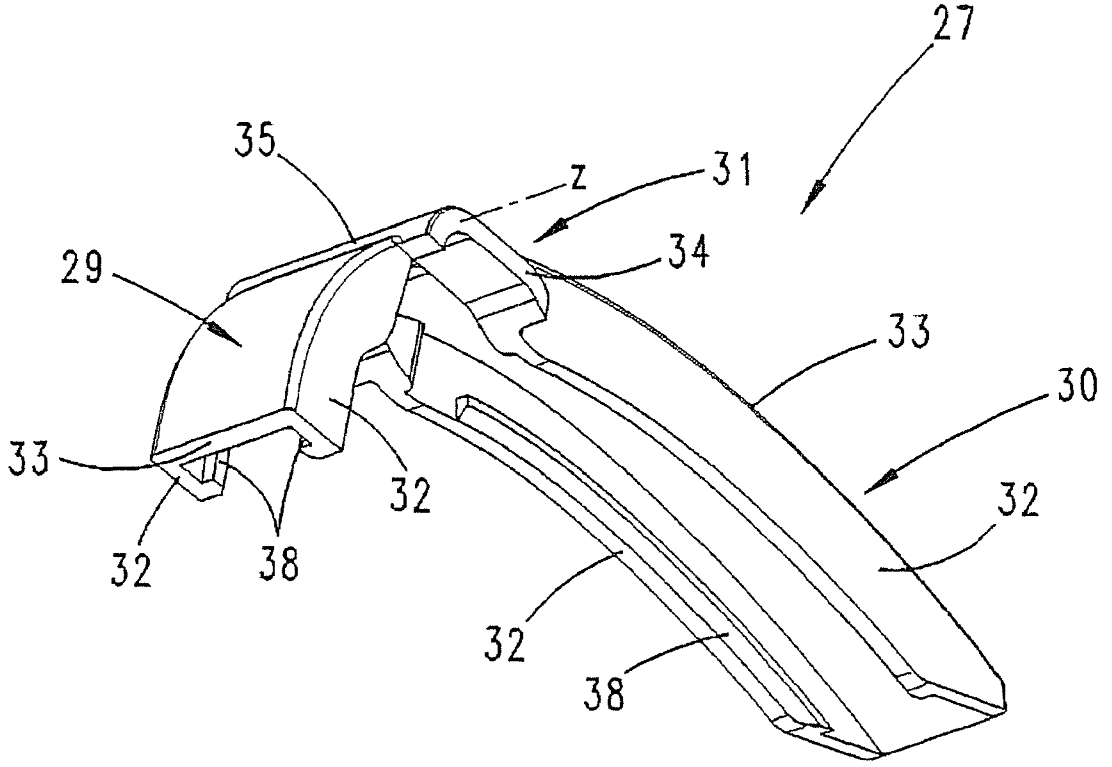
FIG. 19 shows a perspective illustration of the insulating covering.

As can be gathered from the illustrations in FIGS. 8 and 11 in particular, the articulation portions 31 of the insulating coverings 27 are associated with the respective securing pins 22 in the positions in which they are secured on the pressing jaws 3, the U-legs 32, which are interrupted in the articulation portions 31, leaving a free space for these securing pins 22.

FIGS. 10 and 11 illustrate a closed position of the pressing mouth. This is achieved by rolling bodies 13 of the pressing tool, which can be displaced preferably hydraulically in the direction of the inner narrow peripheral sides of the pressing jaws 3, these narrow peripheral sides forming curved tracks 8, and this results in the pressing levers 7 being spread apart in the region of the curved tracks 8 and consequently in the pressing mouth 14, formed by the pressing jaws 3, being closed.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

The invention claimed is:

1. Insulating covering for a pressing jaw of a pair of pressing jaws for hydraulic or electric pressing tools for pressing fittings onto pipes or for the press connection of electric cables, comprising:

- a first portion defined by a pair of legs and a crosspiece extending between said legs, said pair of legs and said crosspiece of said first portion defining a substantially C-shaped cross-section;
- a second portion defined by a pair of legs and a cross-piece extending between said legs of said second portion, said pair of legs and said crosspiece of said second portion defining a substantially C-shaped cross-section; and
- an articulation portion between said first and second portions, said first and second portions and said articulation portion being formed of plastic.

2. Insulating covering as defined in claim 1, wherein said crosspiece of said first portion has a predetermined width and said crosspiece of said second portion has a predetermined width, and said articulation portion has a width which is widened relative to said crosspieces of said first and second portions.

3. Insulating covering as defined in claim 1, wherein the articulation portion is formed eccentrically in relation to a longitudinal extent of the insulating covering.

4. Insulating covering as defined in claim 1, wherein said widths of said crosspiece of said first portion and said crosspiece of said second portion are equal.

5. Insulating covering as defined in claim 1, wherein said first portion further includes a second crosspiece extending from each said leg which forms said first portion, and said second portion further includes a second crosspiece extending from each said leg which forms said second portion.

6. Insulating covering as defined in claim 1, wherein said articulation portion is U-shaped in cross-section.

7. Insulating covering as defined in claim 1, wherein said articulation portion enables said first and second portions to be able to move relative to each other.

8. Insulating covering as defined in claim 1, wherein said first portion has a length which is approximately three times a length of said second portion.

9. Insulating covering as defined in claim 1, wherein said first portion is generally convex along a longitudinal extent and said second portion is generally convex along a longitudinal extent.

10. Insulating covering as defined in claim 9, wherein said first portion curves at a different radius than the second portion.

11. Insulating covering as defined in claim 9, wherein said articulation portion is generally U-shaped along a longitudinal extent.

12. An assembly comprising:

a pair of pressing jaws for hydraulic or electric pressing tools for pressing fittings onto pipes or for the press connection of electric cables, the two pressing jaws being disposed for rotation about an axis, each said pressing jaw including a peripheral edge terminated by first and second opposite ends such that a predetermined length is defined therebetween, said peripheral edge being parallel to said axis, a pressing jaw at said first end, and a drive surface at said second end; and an insulating covering extending along the entire predetermined length of each said peripheral edge, each said insulating covering including an articulation portion, a first portion attached to said respective pressing jaw and extending from said first end toward said second end and covering said first end of said peripheral edge and a predetermined portion of said peripheral edge proximate to said first end, and a second portion attached to said respective pressing jaw and extending from said second end toward said first end and covering said second end of said peripheral edge and a predetermined portion of said peripheral edge proximate to said second end, said articulation portion being formed between said first portion and said second portion and extending parallel to said axis and covering a predetermined portion of said peripheral edge.

13. An assembly as defined in claim 12, wherein a securing rib is provided on each pressing jaw for use in attaching said first and second portions to said respective pressing jaw, the respective securing rib projecting transversely to a longitudinal plane of the respective pressing jaw.

14. An assembly as defined in claim 12, wherein said insulating coverings can be attached and detached from said pressing jaws.

15. An assembly as defined in claim 12, wherein each said insulating covering is formed of plastic.

16. Insulating covering for a pressing jaw of a pair of pressing jaws for hydraulic or electric pressing tools for pressing fittings onto pipes or for the press connection of electric cables, comprising:

a first portion defined by a pair of legs and a crosspiece extending between said legs, said first portion is generally convex along a longitudinal extent, said crosspiece of said first portion having a predetermined width;

a second portion defined by a pair of legs and a crosspiece extending between said legs of said second portion, said second portion is generally convex along a longitudinal extent said crosspiece of said second portion having a predetermined width; and an articulation portion between said first and second portions, said articulation portion having a width which is widened relative to said crosspieces of said first and second portions.

17. Insulating covering as defined in claim 16, wherein said first and second portions and said articulation portion are formed of plastic.

18. An assembly comprising:

a pair of pressing jaws for hydraulic or electric pressing tools for pressing fittings onto pipes or for the press connection of electric cables, the two pressing jaws being disposed for rotation about an axis, each said pressing jaw including a peripheral edge having a predetermined length; and an insulating covering extending along said peripheral edge and having a predetermined length, each said insulating covering including an articulation portion, a first portion attached to said respective pressing jaw, and a second portion attached to said respective pressing jaw, said articulation portion being formed between said first portion and said second portion, said first and second portion formed a convex shape with changing radii along its length.

19. An assembly as defined in claim 18, wherein a securing rib is provided on each pressing jaw for use in attaching said first and second portions to said respective pressing jaw, the respective securing rib projecting transversely to a longitudinal plane of the respective pressing jaw.

20. An assembly as defined in claim 18, wherein said insulating coverings can be attached and detached from said pressing jaws.

* * * * *